United States Patent [19]

Glau

[11] Patent Number: 4,894,491

[45] Date of Patent: Jan. 16, 1990

[54] CABLE COVER ASSEMBLY

[75] Inventor: Gordon Glau, Moreno Valley, Calif.

[73] Assignee: Kraft Systems, Inc., Vista, Calif.

[21] Appl. No.: 297,992

[22] Filed: Jan. 17, 1989

[51] Int. Cl.⁴ .............................................. H05K 5/03
[52] U.S. Cl. ..................................... 174/135; 439/135
[58] Field of Search ...................... 174/16.1, 68.1, 135, 174/138 F; 150/154, 165; 439/135, 367, 718, 892

[56] References Cited

U.S. PATENT DOCUMENTS 3,499,102  3/1970  Gillemot et al. ................. 439/135 X
4,603,229  7/1986  Menchetti ........................ 439/135 X

OTHER PUBLICATIONS

Advertisement entitled "Cache-Back Cable Management for IBM PC and XT Computers", published by Interface, Los Angeles, Calif., dated 2/19/86, one page. Copy in 174-138F.

Primary Examiner—Laramie E. Askin
Attorney, Agent, or Firm—Hecker & Harriman

[57] ABSTRACT

A compact, fully adjustable, universally compatible cable cover assembly which permits a user to cover and retain cabling required for electrical connections of office equipment and, in particular, computer equipment such as a personal computer. The cover assembly is adjustable in width and height to provide universal application. The depth of the cover assembly sufficient to enclose large connectors as well as cabling. Flow ventilation is provided for use with heat sensitive devices. The cover assembly comprises a central support member for slidably engaging first and second end members. The central support member and end members are substantially L-shaped. The end members each includes an opening for accepting a bolt which engages a slot in the central support member for slidably adjusting the width of the cover assembly. Separate bracket members include vertical slots for accepting the same bolts to provide height adjustment of the cover assembly.

8 Claims, 2 Drawing Sheets

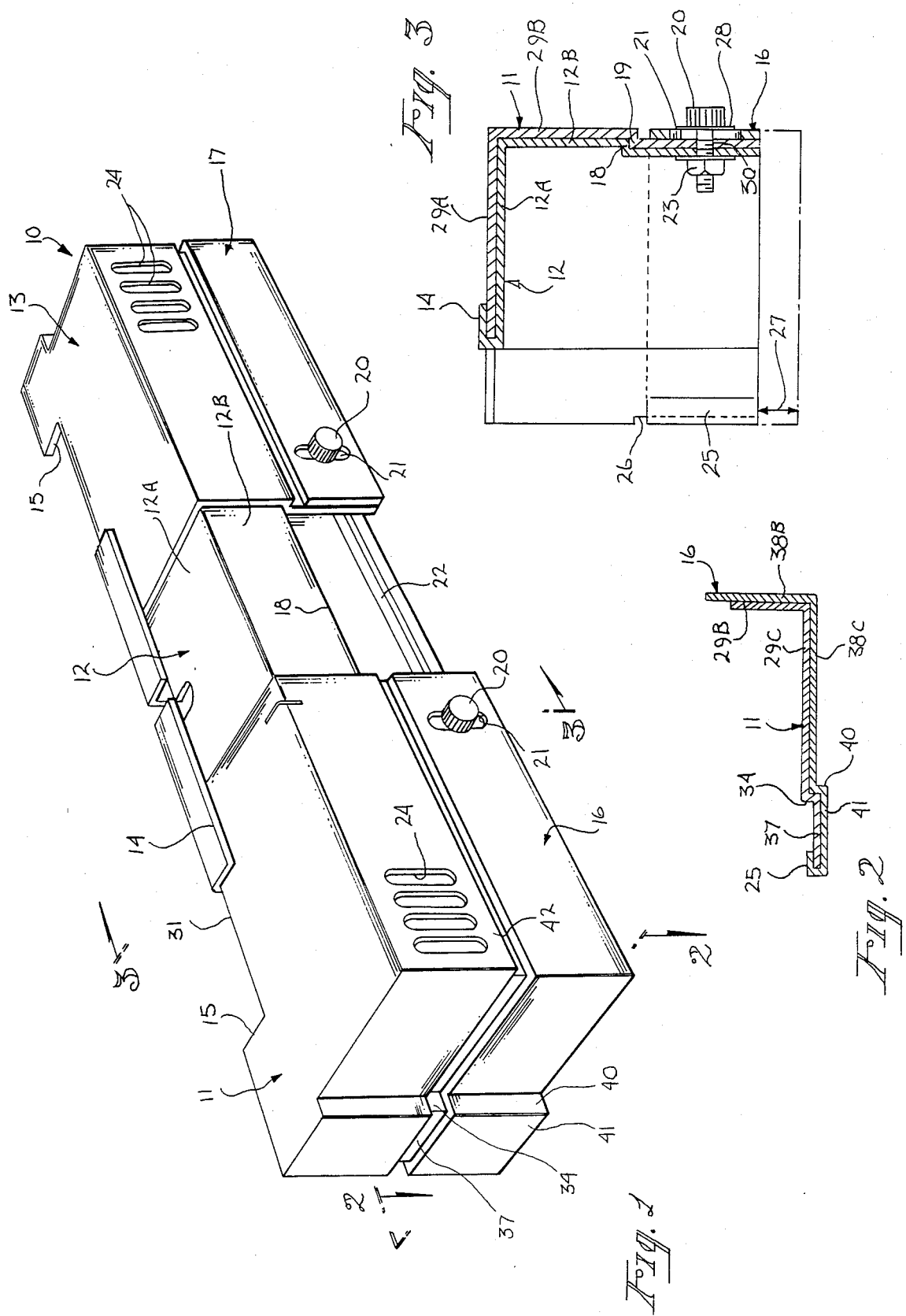

CABLE COVER ASSEMBLY

BACKGROUND OF THE PRESENT INVENTION

1. Field of the Invention

This invention relates to the field of adjustable covers for cables, and in particular to an adjustable cover assembly for concealing cables lines and connectors associated with a computer system.

2. BACKGROUND ART

When a number of electrical devices or tools are used in a work place, a substantial amount of electrical wiring is required. For example, a desk or a work place may have a personal computer with cabling needed for power supply, connection to a network, a telephone modem connection, connection to an external storage device, printer connection and connection to a display monitor.

The number of cables utilized for these connections is unsightly in a work place and can be dangerous. Loose hanging wires can be snagged or caught, causing accidents and damaging expensive equipment. Therefore, it is desired to provide a means for both concealing and retaining the cables while still permitting the necessary electrical connections to be made.

One prior art attempt to meet this need is described in U.S. Pat. No. 4,603,229 to Menchetti, directed to a utility module for walls. The device of Menchetti requires mounting within a wall and connection to adjacent studs of a wall structure. Thus, the device of Menchetti requires that the electrical equipment be located adjacent a wall and fixed in place. However, such "fixed location" equipment is not always feasible. For example, it may be desired to provide electrical equipment for a work space located away from a wall or adjacent to a temporary wall, or it may be desired to provide electrical equipment which may be transported. The device of Menchetti lacks portability.

Gillemot et al., U.S. Pat. No. 3,499,102, is directed to a protective cover for a cable coupling. The device of Gillemot et al. consists of a housing removably coupled to a mounting surface, such as an attachment member sold under the trademark "Velcro", and used to cover cable couplings. The device of Gillemot et al. is only directed to cable couplings, and does not address the retention or concealing of entire cable assemblies.

Therefore, it is an object of the present invention to provide a cable cover assembly which may be used to conceal and retain electrical cables, while still permitting necessary electrical connections.

It is yet another object of the present invention to provide a cable cover assembly which is small, portable and adjustable.

It is still another object of the present invention to provide a cable cover assembly which may be mounted directly on electrical devices, such as a personal computer.

SUMMARY OF THE PRESENT INVENTION

A compact, fully adjustable, universally compatible cable cover assembly is described. The present invention permits a user to cover and retain cabling required for electrical connections of office equipment and, in particular, computer equipment such as a personal computer. The present invention comprises a cover assembly which is adjustable in width and height to provide universal application. The depth of the cover assembly is sufficient to enclose large connectors as well as cabling. Flow ventilation is provided for use with heat sensitive devices.

The present invention comprises a central support member for slidably engaging first and second end members. The central support member and end members are substantially L-shaped. The end members each includes an opening for accepting a bolt which engages a slot in the central support member for slidably adjusting the width of the cover assembly. Separate bracket members include vertical slots for accepting the same bolts to provide height adjustment of the cover assembly. The contour and external dimensions of the central support member and the first and second end members are such that the horizontal movement of the end members with respect to the central support member is permitted. The vertical movement of the end members with respect to the central support member is prevented.

The bracket members are formed to have exterior dimensions substantially identical to a cross section of the end members taken through a horizontal plane. Vertical movement of the bracket members with respect to the end members is permitted while horizontal movement is prevented.

BRIEF DESCRIPTION OF THE DRAWINGS

FIG. 1 is a perspective view of the cover assembly of the present invention.

FIG. 2 is a cross-sectional end view of the cover assembly of FIG. 1, taken along Section line 2—2.

FIG. 3 is a cross-sectional view of the cover assembly taken along Section line 3—3 of FIG. 1.

DETAILED DESCRIPTION OF THE PRESENT INVENTION

Figure 4:
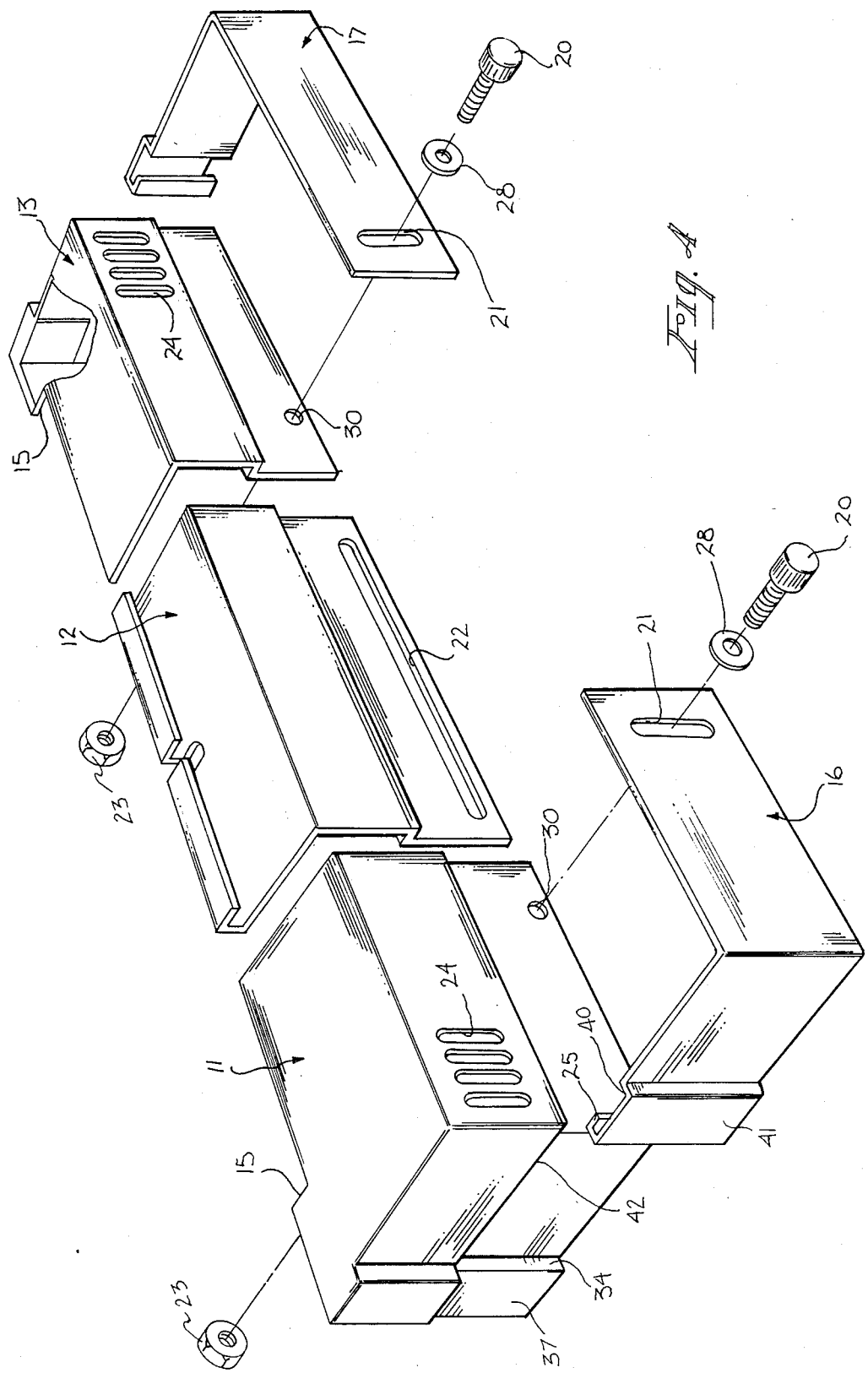
FIG. 4 is an exploded perspective view of the cover assembly of the present invention.

An adjustable, universally compatible cable cover assembly is described. In the following description, numerous specific details, such as composition and dimensions, etc., are set forth in order to provide a more thorough description of the present invention. It will be apparent, however, to one skilled in the art, that the present invention may be practiced without these specific details. In other instances, well-known features have not been described in detail so as not to obscure the present invention.

The present invention is directed to a fully adjustable cable cover assembly which may be removably attached to any number of electronic devices or to any location to provide a means to conceal and retain wiring, cables and connectors. The invention consists of a cover assembly which is adjustable in width and height, so that the cavity formed by the cover assembly may be adjusted to accept a variety of cable and connector configurations. Further, the size and exterior dimensions of the cover assembly may be adjusted to fit a variety of electrical devices.

In the preferred embodiment of the present invention, the cover assembly is used in connection with a personal computer to cover cables used to connect the computer to printers, telephones, modems, networks, etc. However, the cover assembly has equal application to a variety of devices and may be used externally from the devices wherever there is a need to conceal or retain cables.

Many personal computer systems require cooling through use of an internal fan or other means, and often require that sufficient air flow be available around the computer to prevent overheating. Therefore, the present invention provides flow-through venting to permit the flow of ambient air to the computer or other device. In addition, rather than completely enclosing cables, the present invention covers them on five sides, with a bottom portion of the cover assembly being open to provide for the flow of ambient air.

The present invention consists primarily of five elements, a central support members, two end members and two bracket members. In the preferred embodiment of the present invention, the end members are two "mirror image" pieces, as are the bracket members. The cross-section of each end member is subsubstantially identical to the cross-section of the central support member in a vertical plane. The cross-section is substantially L-shaped and includes ridges, flanges and lips to provide a track-like construction for slidable engagement of the end members with the central support member. The central support member/end member assembly provides for adjustment in the horizontal dimension for the cover assembly of the present invention. Flanges and lips prevent vertical movement of the end members with respect to the central support member while allowing horizontal movement of the end members with respect to the central support member.

The cross-section of each bracket member is substantially identical to the crosssection of each end member in a horizontal plane. This cross-section is substantially L-shaped as well, with a number of irregularities such as extending faces and flanges to provide a track-like construction for slidable engagement of the bracket members with the end member. This cross-sectional shape allows for vertical movement of the bracket members with respect to the end members so that the cable cover assembly may be adjusted in the vertical dimension. However, horizontal movement of the bracket members with respect to the end members is prevented. When combined, the central support member, end members and bracket members form a cable cover assembly which is adjustable in both the vertical and horizontal directions to provide a universal cable cover assembly for a variety of applications.

A perspective view of the cable cover assembly of the present invention is illustrated in FIG. 1. The drawing of FIG. 1 shows the cover assembly in the assembled state. The cover assembly 10 is a housing consisting of a central support member 12 coupled to a first end member 11 and a second end member 13. When viewed in cross-section, in a vertical plane (see FIG. 3), the central support member 12 and end members 11 and 13 are substantially L-shaped. The cross-sections of the central support member and end members include irregularities to provide a track-like construction for slidable engagement of the end members with the central support member. Referring to both FIGS. 1 and 3, the central support member 12 consists of an upper plane section 12A and a back plane section 12B. The end members include upper plane sections 29A and back plane sections 29B.

The upper plane section 12A of the central support member 12 is turned back on itself to form a flange 14 with a recessed area to receive the upper surfaces of end members 11 and 13. The back plane section 12B of the central support member 12 includes a recessed portion 18, which mates with an extended surface 19 of the back plane section 29B of the end members 11 and 13, so that the end members 11 and 13 are slidably engaged with the central support member 12.

Referring to FIG. 3, the upper plane section 29A of end member 11 engages the recessed portion of central support member 12 beneath flange 14 for securing and retaining the end member 11, while still permitting slidable engagement. The extended surface 19 of the end member 11 forms a seat to mate with the recessed portion 18 of the central support member 12. Thus, vertical movement of the end member with respect to the central support member 12 is prevented. However, horizontal movement of the two members with respect to each other is permitted because of the sliding nature of the engagement of the members.

Referring to FIG. 1, the central support member 12 includes a horizontal slot 22 for receiving bolts 20. Each end member 11 and 13 includes an opening 30 (see FIG. 4) for receiving a bolt so that the end members 11 and 13 may be locked in place with respect to the central support member 12. The bolts 20 extend through the openings 30 and through the horizontal slot 22. The end members 11 and 13 may be moved back and forth with respect to the central support member 12, so that the horizontal dimensions of the cover 10 may be adjusted by the user. Once the desired dimensions is achieved, the bolts are used to hold the end members in place. Referring briefly to FIG. 3, a nut 23 engages bolt 20 to lock the end member 11 in place with respect to the central support member 12. A washer 28 may be provided beneath the head of each bolt.

The end members include vents 24 for providing flow-through cooling to the interior of the cover assembly 10. Generally, the top edge 31 of the cover assembly 10 engages a surface of a device such as a personal computer. Therefore, the cover assembly 10 is enclosed on five sides. However, the bottom of the cover assembly 10 is left open so that air may flow freely through the vents 24 and through the cover assembly 10. In addition, by having an open bottom, portions of the cable may extend from the cover assembly to the required connection locations.

Adjustability in the vertical dimension is provided by the use of bracket members 16 and 17. The cross-section of each bracket member is substantially identical to the cross-section of the end members taken through a horizontal plane (see FIG. 2), so that the bracket members 16 and 17 may be slidably engaged to the end members 11 and 13. Referring to FIG. 2, a cross-section of the end member 11 and bracket member 16 taken along Section line 2—2 is shown. The end member 11 includes a back plane section 29B, substantially perpendicular to a side plane section 29C. The bracket member 16 includes a back plane section 38B and a side plane section 38C.

The side plane section 29C of end member 11 includes an extended surface 37 creating edge 34 on side plane section 29C. Extended surface 37 is substantially parallel to the major surface of side plane section 29C. The side plane section 38C of bracket member 16 includes an extended surface 41 creating edge 40 which abuts edge 34 of end member 11, providing registration between bracket member 16 and end member 11.

The extended surface 41 is turned back on itself, forming flange 25, to receive extended surface 37 of end member 11. This provides for slidable engagement in the vertical direction (as indicated by the arrow 27 in FIG. 3) between the end member 11 and bracket member 16. Each end member includes a notch to accommodate the flange 25 of the associated bracket member, as shown at 26 on the end member 11 in FIG. 3. Referring again to FIG. 1, the end member 11 includes an overhanging edge 42, which sets a limit on the upward movement of the bracket member 16 with respect to the end member 11. The bracket member 16 includes a vertical slot 21 for receiving the bolt 20. This vertical slot is registered with the opening 30 of the end member 11. Thus, the vertical dimensions of the end member/central support member/bracket member assembly can be adjusted by a user to match various requirements.

An exploded view of the cable cover assembly of the present invention is illustrated in FIG. 4. As shown in FIG. 4, the slot 22 extends substantially along the length of the central support member 12. The upper plane sections of the end members 11 and 13 include extended edges 15 which may be disposed about the sides of a rectangular device such as a personal computer so that by adjusting the width of the cover assembly the cover assembly can be made to "grip" the device so that the cover assembly may be retained on the device.

Thus, a fully-adjustable, universally applicable cable cover assembly has been described.

I claim:

1. A cover assembly comprising:
   a central support member having a first surface disposed substantially perpendicular to a second surface, said second surface having a first elongated slot formed therein;
   at least one end member slidably engaged with said central support member, said end member having third, fourth and fifth surfaces disposed substantially perpendicularly to each other, said fourth surface having an opening formed therein registered with said first elongated slot;
   said central support member having a lip formed on said first surface receiving an edge of said end member to permit slidable movement of said end member with respect to said central support member, and prevent vertical movement of said central support member with respect to said end member;
   at least one bracket member slidably engaged with said end member, said bracket member having a sixth surface disposed substantially perpendicular to a seventh surface, said bracket member having a second elongated slot formed therein registered with said first elongated slot and said opening;
   said bracket member having a second lip formed thereon receiving an edge of said fifth surface of said end member for permitting slidable movement of said bracket member with respect to said end member.

2. The cover assembly of claim 1 further including a bolt disposed through said first elongated slot, said opening and said second elongated slot for releasably fixing the positions of said central member, said end member and said bracket member with respect to each other.

3. The cover assembly of claim 1 further including a plurality of vents formed in said end member of for permitting air flow through said end member.

4. The cover assembly of claim 1 wherein said first elongated slot is substantially perpendicular to said second elongated slot.

5. The cover assembly of claim 1 wherein said end member includes a ridge on said fourth and fifth surfaces for limiting movement of said bracket member in the vertical direction.

6. A cover assembly comprising:
   a central support member having a first surface disposed substantially perpendicularly to a second surface, said second surface having a first elongated slot formed therein;
   said central support member having a lip formed at one edge of said first surface;
   first and second end members, each of said first and second end members having third, fourth and fifth surfaces disposed substantially perpendicularly to each other, said first and second end members slidably engaged with said central support member, said lip of said central support member slidably receiving an edge of said third surface of said first and second end members;
   said first and second end members each having an opening formed therein registered with said first elongated slot of said central support member;
   first and second bracket members coupled to and slidably engaged with said first and second end members respectively, said first and second bracket members each having a sixth surface disposed substantially perpendicularly to a seventh surface, said first and second bracket members each having a second elongated slot formed in said sixth surface thereof and registered with said first elongated slot and a respective said opening.

7. The cover assembly of claim 6 further including a plurality of vents formed in said end members for permitting air flow through said end members.

8. The cover assembly of claim 6 wherein said first elongated slot is substantially perpendicular to said second elongated slot.

* * * * *